United States Patent [19]

Ooi

[11] Patent Number: 5,589,885
[45] Date of Patent: Dec. 31, 1996

[54] MOVING PICTURE CODING AND DECODING CIRCUIT

[75] Inventor: Yasushi Ooi, Tokyo, Japan

[73] Assignee: NEC Corporation, Tokyo, Japan

[21] Appl. No.: 400,499

[22] Filed: Mar. 8, 1995

Related U.S. Application Data

[63] Continuation of Ser. No. 32,300, Mar. 17, 1993, abandoned.

[30] Foreign Application Priority Data

Mar. 17, 1992 [JP] Japan ..................... 4-058697

[51] Int. Cl.$^6$ .................................. H04N 7/32
[52] U.S. Cl. ........................... 348/416; 348/699
[58] Field of Search .................... 348/406, 407, 348/412, 416, 390, 384, 411, 420, 400, 401, 403–405, 409–410, 413, 415, 699; 382/232, 233, 236, 238, 248–251; H04N 7/33, 7/37

[56] References Cited

U.S. PATENT DOCUMENTS

| | | | |
|---|---|---|---|
| 4,999,705 | 3/1991 | Puri ............................ | 348/412 |
| 5,122,875 | 6/1992 | Raychaudhuri et al. ....... | 348/390 |
| 5,146,325 | 9/1992 | Ng ............................. | 348/384 |
| 5,231,484 | 6/1993 | Gonzales et al. ............ | 348/407 |
| 5,418,617 | 5/1995 | Naimpally et al. .......... | 348/416 |
| 5,448,300 | 9/1995 | Yamada et al. .............. | 348/390 |

OTHER PUBLICATIONS

Hardware of NETEC–VisuaLink, Collection of Drafts for Autumnal national Conference of Electronic Information Communications Institute, 1989, pp. A–316–A–321. (No English Translation).

"Nikkai Electronics," No. 511, Oct. 15, 1990, pp. 116–142.

Ang et al, "Video Compression Makes Big Gains," *IEEE Spectrum*, pp. 16–19 (1991).

Sijstermans et al, "CD–I Full–Motion Video Encoding on a Parallel Computer," *Communications of the ACM*, 84:82–91, (1991).

*Primary Examiner*—Thai Q. Tran
*Assistant Examiner*—Richard Lee
*Attorney, Agent, or Firm*—Foley & Lardner

[57] ABSTRACT

A moving picture coding and decoding circuit which can cope with a plurality of algorithms to reduce the number of components and facilitate extension. A picture to be coded is inputted to a motion detection/prediction section, which outputs a predictive difference signal and a predictive signal. DCT processing and quantization are performed for the predictive difference signal by a conversion coding and decoding section, from which a conversion coefficient signal is outputted to an interface bus. The conversion coding and decoding section also executes dequantization and inverse DCT processing of the conversion coefficient, adds the predictive signal to the conversion coefficient and outputs a result of the picture coding to an image data bus. A programmable architecture as in a digital signal processor is applied to the conversion coding and decoding section. The conversion coefficient outputted from the conversion coding and decoding section is stored into a FIFO memory of a zigzag scan/entropy coding section and then undergoes coding in an entropy coding section. A bit stream thus coded is stored once into and then outputted as codes from another FIFO memory.

4 Claims, 8 Drawing Sheets

MOVING PICTURE CODING AND DECODING CIRCUIT

This application is a continuation of application Ser. No. 08/032,300, filed Mar. 17, 1993 now abandoned.

BACKGROUND OF THE INVENTION

1. Field of the Invention

This invention relates to a moving picture coding and decoding circuit, and more particularly to a programmable moving picture coding and decoding circuit which codes a moving picture based on a high efficiency coding algorithm.

2. Description of the Related Art

Generally, an algorithm for coding a moving picture is constructed not from a single algorithm but from a plurality of algorithms in combination. For example, according to the H.261 document of the CCITT which specifies the moving picture coding standards, coding of a high efficiency is realized by the combination of motion compensation interframe prediction, discrete cosine transform (DCT), quantization and entropy coding. Also with another international standardization draft regarding moving picture coding, a moving picture coding algorithm is realized by a combination of algorithms similar to those mentioned above.

Conventional moving picture coding and decoding circuits adopt two types of circuit configurations. The first type circuit configuration makes use of a high speed digital signal processor (DSP) to realize all of the algorithms as software processing. While the software processing making use of a DSP is superior in flexibility in modification to the algorithms, DSPs at the present time only have a performance of 1/10 to 1/60 or so the performance required for coding of a moving picture (300 MOPS to 600 MOPS, MOPS: Million Operations per Second). Accordingly, in order for a DSP to execute moving picture coding processing, it Is necessary to adopt such a measure as to employ a multi-processor configuration wherein a large number of DSPs are coupled. Where such system configuration is employed, in most cases, an increase of the cost of software/hardware is invited. For example, according to "Hardware of NETEC-VisuaLINK", Collection of Drafts For Autumnal National Conference of Electronic Information Communications Institute in 1989, A316–A321, twenty or more DSPs are required for a coding circuit.

The second type circuit configuration employs, for each algorithm, a suitable circuit construction for exclusive use and communicates image data among a plurality of processing sections of them like pipeline communication so as to cause the image data to be processed in the processing sections. When importance is attached to the performance, it is the best policy to couple a plurality of different processors for exclusive use so as to execute parallel pipeline processing. If a circuit configuration optimum to an algorithm is taken, in most cases the number of processors of a multi-processor is reduced comparing with an alternative arrangement which is constituted from DSPs. The processor for exclusive use here need not always be a processor corresponding to a single algorithm. Some of actual conventional processors for exclusive use are constructed so that two algorithms are combined and executed by a single processor. For example, in the United States or some other countries, such a processing LSI that executes two operations including DCT and addition of frame differences by means of a single LSI chip has been developed, and an LSI chip set wherein entire moving picture coding and decoding processing is covered by 5 to 10 LSI chips has been developed. In the LSI chip set, the number of necessary components for a coding circuit is 6 or so. This can apparently be seen from an article of Nikkei Electronics, No. 511, Oct. 15, 1990.

A moving picture coding and decoding circuit of the second circuit configuration described above is disadvantageous in that, once a circuit construction for exclusive use is determined for each algorithm, operation for modifying the circuit configuration is complicated and a high cost is required for such modification. In particular, in the case of software processing, it is possible to cope with a modification to an algorithm by modification to the software, but where a processor for exclusive use is employed, redesigning of the processor is required to cope with the modification to an algorithm and this requires a high cost. Besides, where a moving picture coding and decoding circuit has a circuit configuration of the second type, generation of an address of a frame memory, which is required for moving picture processing, and a process developing timing synchronized with such address generation are complicated. It is to be noted that, where a moving picture coding and decoding circuit has a circuit configuration of the first type, a DSP itself generates an address of a frame memory. Further, each processor for exclusive use executes, in most cases, processing of a set of algorithms described above so that the data flow amount may be fixed. For example, in the case of a DCT processor, such interface is taken wherein, if picture information to be transformed is inputted sequentially, results of the conversion are sequentially outputted for a fixed period of time.

In this instance, the problems of (1) how to control the timings of starting and ending of DCT processing for each block, (2) from where data for which DCT processing is to be performed should be read out, and if such data is to be read out from a frame memory, how to generate an address therefor, and (3) to where a result of DCT processing should be written, and if it should be written into the frame memory, how to generate an address therefor, must all be solved by an external circuit outside the DCT processor, and accordingly, there is a problem that the advantage of reduction of the design cost or of the number of parts of an external circuit is low.

SUMMARY OF THE INVENTION

It is an object of the present invention to provide a moving picture coding and decoding circuit which can cope with a plurality of algorithms to reduce the number of components and facilitate extension.

In order to attain the object described above, according to an aspect of the present invention, there is provided a moving picture coding and decoding circuit capable of coding a moving picture based on a high efficiency coding algorithm, which comprises first processing means for inputting picture data divided into a plurality of block regions and executing conversion coding of the picture data to output a conversion coefficient obtained by the conversion coding for each of the blocks, and second processing means for inputting the conversion coefficient and executing entropy coding of the conversion coefficient to output bit variable length code data as a result of the entropy coding, the second processing means including a video timing control section which provides an output signal by which all of the timing of starting of coding of the first processing means and the timings of starting of transfer of data between the first and second processing means are controlled.

According to another aspect of the present invention, there is provided a moving picture coding and decoding circuit capable of coding each of picture frames of a moving picture based on one of three predictive coding methods for an intra-frame coded picture, a predictive coded picture and a bidirectional predictive coded picture, which comprises first processing means for executing motion detection and motion prediction of a moving picture and outputting an image predictive difference signal and an image predictive signal, core frame memory means for storing therein picture frame data necessary for execution of the predictive coding, second processing means for executing conversion coding with the picture predictive difference signal to output a conversion coefficient and adding the picture predictive signal to the picture predictive difference signal to output a result of picture decoding, and third processing means for executing entropy coding based on the conversion coefficient and outputting bit variable length code data as a result of the entropy coding, the third processing means including a video timing control section which provides an output signal by which the timing of starting of coding of the second processing means and the timings of starting of transfer of data between the first, second and third processing means are controlled, the first processing means including an address generation control section which provides an address output signal for designating an address of the core frame memory means.

According a further aspect of the present invention, there is provided a moving picture coding and decoding circuit capable of coding each of picture frames of a moving picture based on one of three predictive coding methods for an intra-frame coded picture, a predictive coded picture and a bidirectional predictive coded picture, which comprises first processing means for executing motion detection and motion prediction of a moving picture and outputting an image predictive difference signal and an image predictive signal, core frame memory means for storing therein picture frame data necessary for execution of the predictive coding, second processing means for executing conversion coding with the picture predictive difference signal to output a conversion coefficient and adding the picture predictive signal to the picture predictive difference signal to output a result of picture decoding, and monitor frame memory means for storing therein picture frame data with which a result of the picture coding is to be monitored, third processing means for executing entropy coding based on the conversion coefficient and outputting bit variable length code data as a result of the entropy coding, a first data bus for coupling the core frame memory means and the first and second processing means to each other, a second data bus coupled to the monitor frame memory means, and bus buffer means for coupling the first and second data buses, the first processing means including a two-dimensional address generation section which provides an address of the core frame memory means, the third processing means including a two-dimensional address generation section which provides an address of the monitor frame memory means.

With the moving picture coding and decoding circuits, when the entire moving picture high efficiency coding algorithm is divided into three processing portions based on characteristics of the algorithm, particularly on the parallel practicability, and the three processing portions are processed by architectures suitable for the individual processes, since the means corresponding to processing sections including a zigzag scan/entropy coding section and a conversion coding and decoding section are constructed so as to be software programmable, execution of processing which is not fixed only to a particular algorithm can be realized. Further, since the timings of accesses to the core frame memory involved in moving picture inter-frame motion detection and motion prediction processing and generation of memory addresses are controlled in a concentrated manner by the means corresponding to a motion compensation section and transfer of data among the processing means and transfer of data to and from the frame memory are performed by way of the two buses, decoding processing of a moving picture can be executed with a simple system configuration and a small number of parts. Further, since the conversion coding and decoding means can be activated in units of a unit picture region (for example, 8 picture elements×8 picture elements), the moving picture coding and decoding circuit need not depend upon processing timings of the entire screen, and consequently, the independence in timing between a conversion coding section and an entropy decoding section can be maintained. Accordingly, such extension as, for example, to connect a plurality of conversion decoding sections to the single entropy decoding section can be achieved readily.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
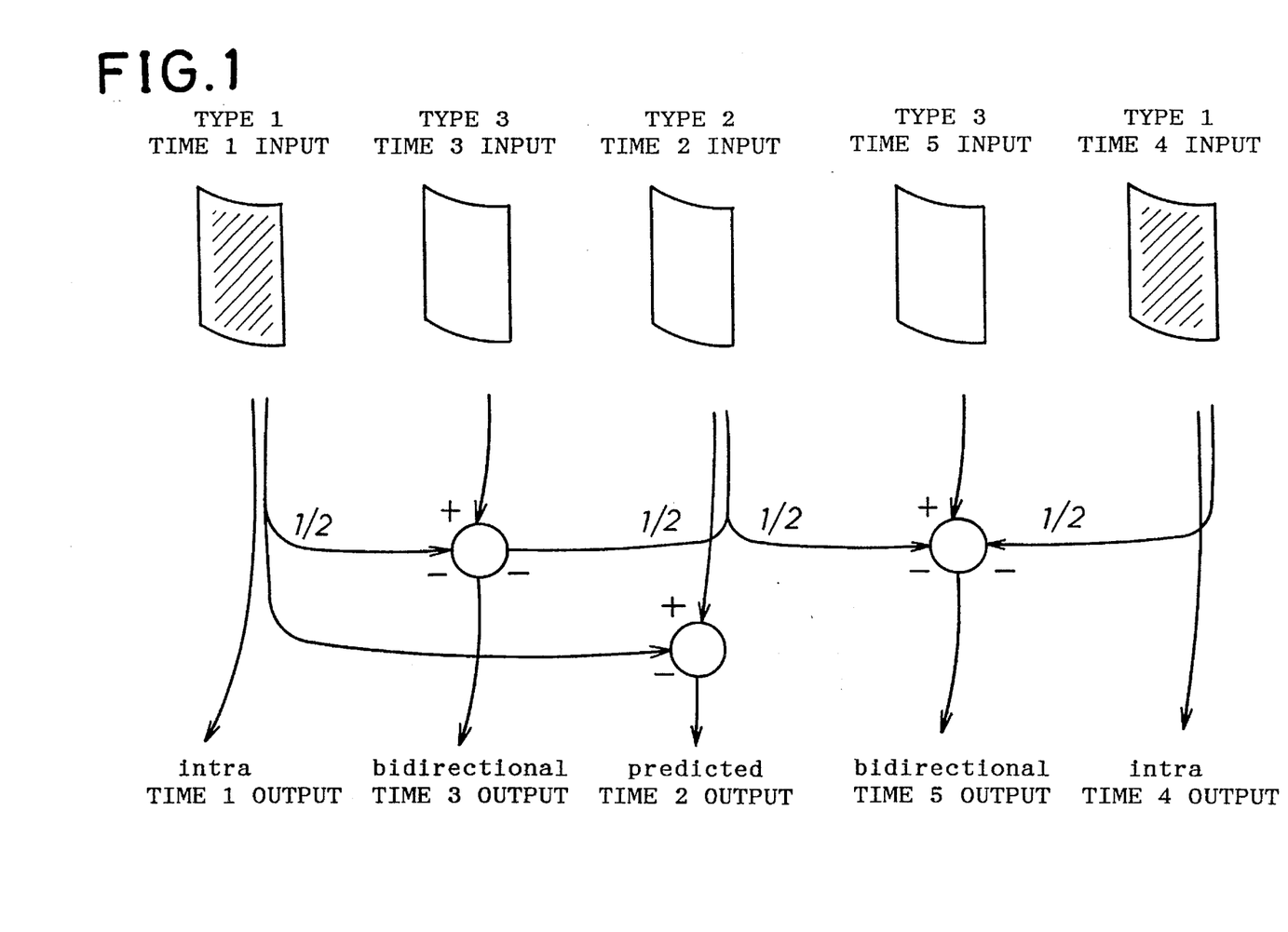
FIG. 1 is a diagrammatic view illustrating three picture coding methods used in a moving picture coding and decoding circuit of the present Invention.

Referring first to FIG. 1, there is illustrated a concept of three picture coding methods used in a moving picture coding and decoding circuit of the present invention. According to the moving picture coding algorithm which is planned to be recommended in the MPEG (Moving Picture Expert Group) of the ISO (International Organization for Standardization), one of three types of coding methods is selected for each frame. The picture coding method of the type 1 does not involve coding of a picture in the direction of the time axis, but involves orthogonal transformation in a two-dimensional space. A picture coded in this manner is called intra-frame (I-frame) picture. Meanwhile, the picture coding method of the type 2 involves orthogonal transformation, of a difference of a picture from another picture in the past. A picture coded in this manner is called predicted frame (P-frame) picture. The picture in the past here is either an I-frame picture or a P-frame picture. Further, the picture coding method of the type 3 involves orthogonal transformation of a difference of a picture from an arithmetic mean of two pictures in the past and in the future. A picture coded in this manner is called bidirectional frame (B-frame) picture. Each of the pictures in the past and in the future here is either an I-frame picture or a P-picture frame.

On the other hand, in order to achieve the conformity with the MPEG of the ISO, picture coded data of all of the three types must necessarily be decoded. However, as regards coding, it is possible to make choice in accordance with the coding time, the cost or the picture quality such as omission of P-frames, omission of B-frames or omission of both of P- and B-frames. For coding of a P-frame, an I-frame or a P-frame which precedes in time is required. Such I-frame or P-frame is called core frame. Since a B-frame is produced by temporal interpolation from a core frame, the order in time of coded pictures to be sent is different from pictures to be decoded. In particular, the code outputting order in FIG. 1 is different from an ordinary sequential order of pictures, and in this instance, also the picture inputting order in FIG. 1 must be made a different one. Such pre-processing is called frame conversion.

Further, when coding is performed including the picture coding methods of the types 1, 2 and 3 described above, frame conversion is required. The moving picture coding and decoding circuit of the first embodiment described below is constructed so as to cope with such case. When all pictures are to be coded only in accordance with the picture coding method of the type 1, a difference between frames need not be taken, and accordingly, no frame conversion processing is required. A moving picture coding and decoding circuit constructed based on the conception is the second embodiment of the present invention. Besides, when it is desired to supervise the influence upon the picture quality of a quantization error upon picture coding simultaneously with coding processing, a decoded image must necessarily be reproduced as it is, and the moving picture coding and decoding circuit of the third embodiment is constructed so as to cope with such case.

Figure 2:
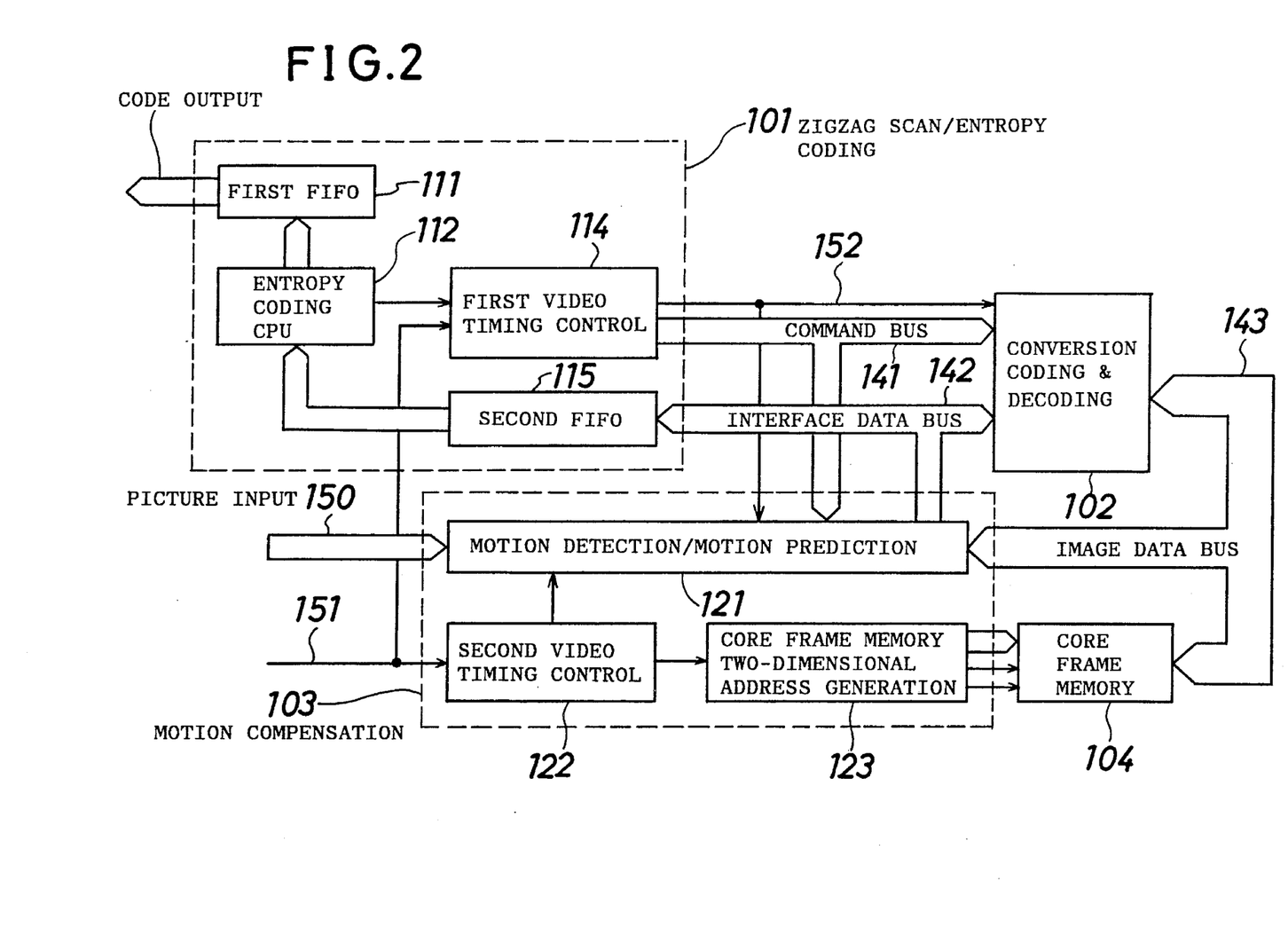
FIG. 2 is a block diagram of a moving picture coding and decoding circuit showing a first preferred embodiment of the present invention.

Referring now to FIG. 2, there is shown a moving picture coding and decoding circuit according to a first preferred embodiment of the present invention. The moving picture coding and decoding circuit shown includes, as principal components thereof, a zigzag scan/entropy coding section 101, a conversion coding and decoding section 102, a motion compensation section 103, and a core frame memory 104.

The motion compensation section 103 includes a motion detection/motion prediction section 121 for executing detection and prediction of motion based on a picture input 150, a second video timing control section 122 for inputting a picture frame synchronizing signal 151 and controlling the motion detection/motion prediction section 121, and a core frame memory two-dimensional address generation section 123 for generating a two-dimensional address of the core frame memory 104 based on an output of the control section 122. Particularly, while the motion detection/motion prediction section 121 executes motion detection and motion prediction processing of the picture 150 inputted thereto from the outside, control timings of all of the motion detection and motion prediction processing of the motion detection/motion prediction section 121 including activation of the same are controlled by the timing control section 122. Besides, the picture frame synchronizing signal 151 for controlling the timing control section 122 is inputted at a timing preceding to the picture input 150. Further, as a predictive picture (of an I- or P-frame) which makes a reference to execution of motion detection, an input picture itself or an input picture after it has been coded and then decoded by the conversion coding and decoding section 102 is stored by way of an image data bus 143 into the core frame memory 104. Generation of an address in this instance is executed by the two-dimensional address generation section 123 in response to a starting signal generated by the timing control section 122 as described above. For a picture (of a P- or B-frame) for which such detection of motion is required, motion detection and motion prediction processing by comparison between a picture stored in the core frame memory 104 and the external input picture 150 is executed. Generation of a read address of the core frame memory 104 in this instance is executed by the two-dimensional address generation section 123. As a result of such processing by the motion detection/motion prediction section 121, when the input picture 150 is a picture of an I-frame, the input picture 150 itself is transferred to the conversion coding and decoding section 102 by way of the interface data bus 142, but when the input picture 150 is a picture of a P- or B-frame, a difference signal between the input picture and a reference picture (predictive picture) is transferred to the conversion coding and decoding section 102 by way of the interface data bus 142.

Meanwhile, the conversion coding and decoding section 102 executes coding and decoding processing principally including orthogonal transformation such as DCT (Discrete Cosine Transform). In particular, the conversion coding and decoding section 102 transfers data obtained by conversion coding (orthogonal conversion and quantization) of an input picture from the interface bus 142 to a second FIFO (first-in first-out) memory 115 of the zigzag scan/entropy coding section 101 again by way of the bus 142. All timings of the conversion coding and decoding section 102 including starting of the same are controlled by control signals including a command timing signal from a first video timing control section 114 indicative of a timing itself and a command signal 141 indicative of a kind of processing to be started. It is to be noted that a signal for activating the video timing control section 114 follows a picture frame synchronizing signal 151 inputted thereto from the outside similarly as in activation of the second timing control section 122. Further, in the processing of a picture of an I- or P-frame, data obtained by conversion coding of an input picture from the interface data bus 142 and conversion decoding (dequantization and inverse orthogonal transform) of the coded picture is stored into the core frame memory 104 by way of the Image data bus 143. The picture of the I- or P-frame stored in the core frame memory 104 in this manner makes a reference picture for execution of motion detection and prediction described hereinabove.

The zigzag scan/entropy coding section 101 includes, in addition to the first video timing control section 114 and the second FIFO memory 115 mentioned hereinabove, an entropy coding CPU (central processing unit) 112 for coding data of the second FIFO memory 115 by entropy coding, and a first FIFO memory 111 for temporarily storing therein the data processed by the entropy coding CPU 112 and outputting the stored coded data. The coding section 101 executes coding of conversion coded data transferred to the second FIFO memory 115 based on statistic information such as, for example, run-length coding or entropy coding at the entropy coding CPU 112. A result of the processing is written into the FIFO memory 111. In this instance, when necessary, the coding CPU 112 applies feedback such as coding amount control to the contents of a command outputted from the video timing control section 114. The contents of the FIFO memory 111 are outputted as a final result of coding to the outside.

In summary, the external input picture 150 is processed successively by the motion compensation section 103, the conversion coding and decoding section 102 and the zigzag scan/entropy coding section 102 and outputted as a code to the outside.

Figure 3:
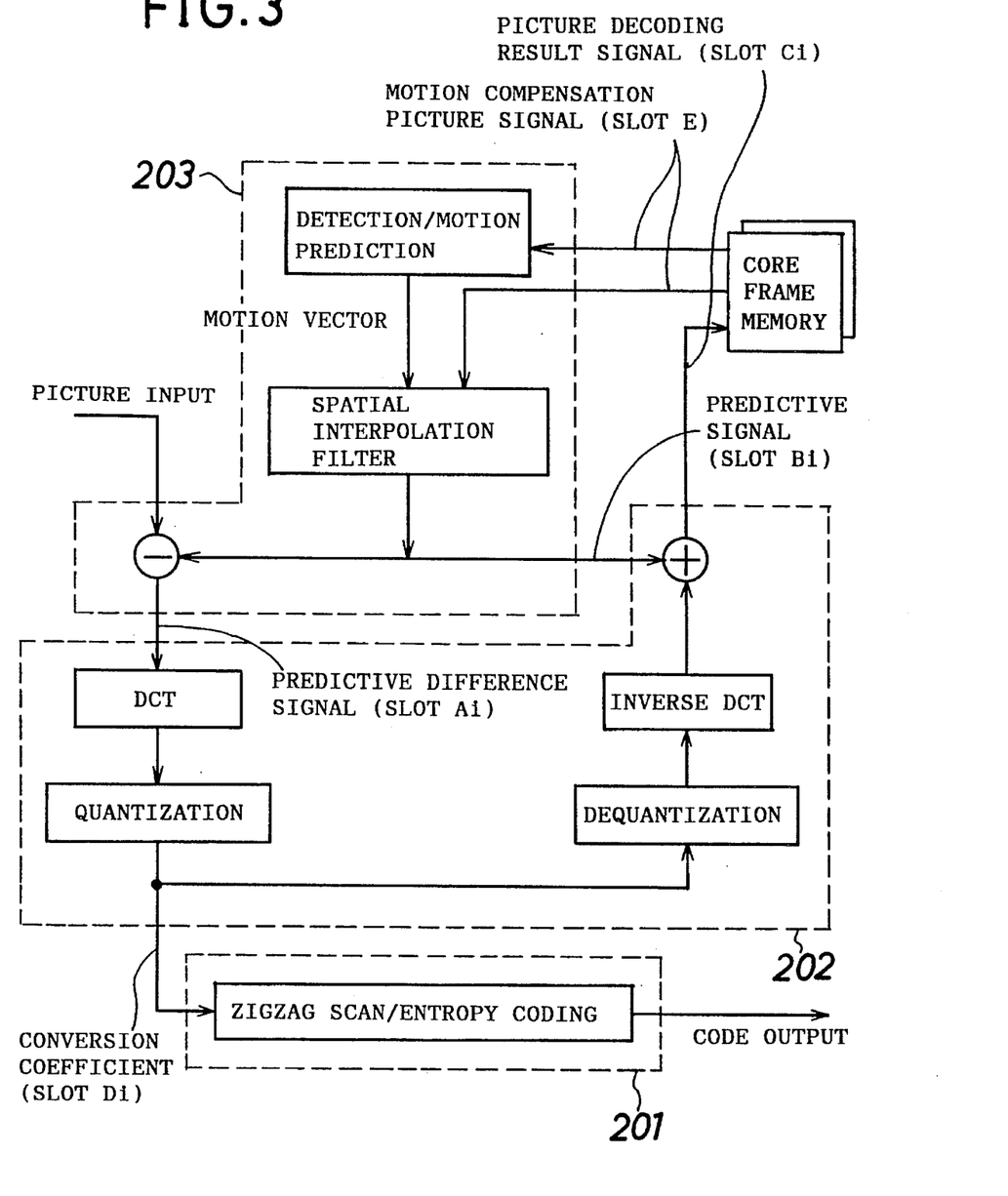
FIG. 3 is a flow diagram illustrating a picture coding algorithm employed In the moving picture coding and decoding circuit of FIG. 2.

FIG. 3 illustrates a flow of operations of a moving picture coding algorithm employed by the moving picture coding and decoding circuit shown in FIG. 2. The algorithm illustrated is an algorithm of the MPEG for coding of a moving picture, and blocks 201 to 203 in FIG. 3 correspond to algorithms processed by the components 101 to 103 shown in FIG. 2, respectively. Further, hierarchic time-division multiplex transfer is performed to the coding section 101, the conversion coding and decoding section 102 and the motion compensation section 103. Hierarchies here correspond to processing hierarchies specified by the MPEG, and besides, those of the hierarchies which relate to time-division multiplex transfer are a macroblock layer and a block layer. A macroblock, which is a unit of such processing of the MPEG, consists of four brightness blocks Y0 to Y3 and two spatially corresponding color difference blocks Cb and Cr, and each of the blocks consists of a square area of 8×8 picture elements. A typical MPEG video sequence includes 330 macroblocks (22 rows×15 columns) per one frame. Further, in a basic mode of the MPEG, up to 30 pictures of this size must necessarily be processed for one second, and if this is converted into a number of blocks, processing of 59,400 blocks is required for one second. Consequently, the cycle time permitted for block processing is about 16.6 μsec or so taking a margin for a retrace line period into consideration. Similarly, the cycle time permitted for macroblock processing is 100 μsec or so.

Figure 4:
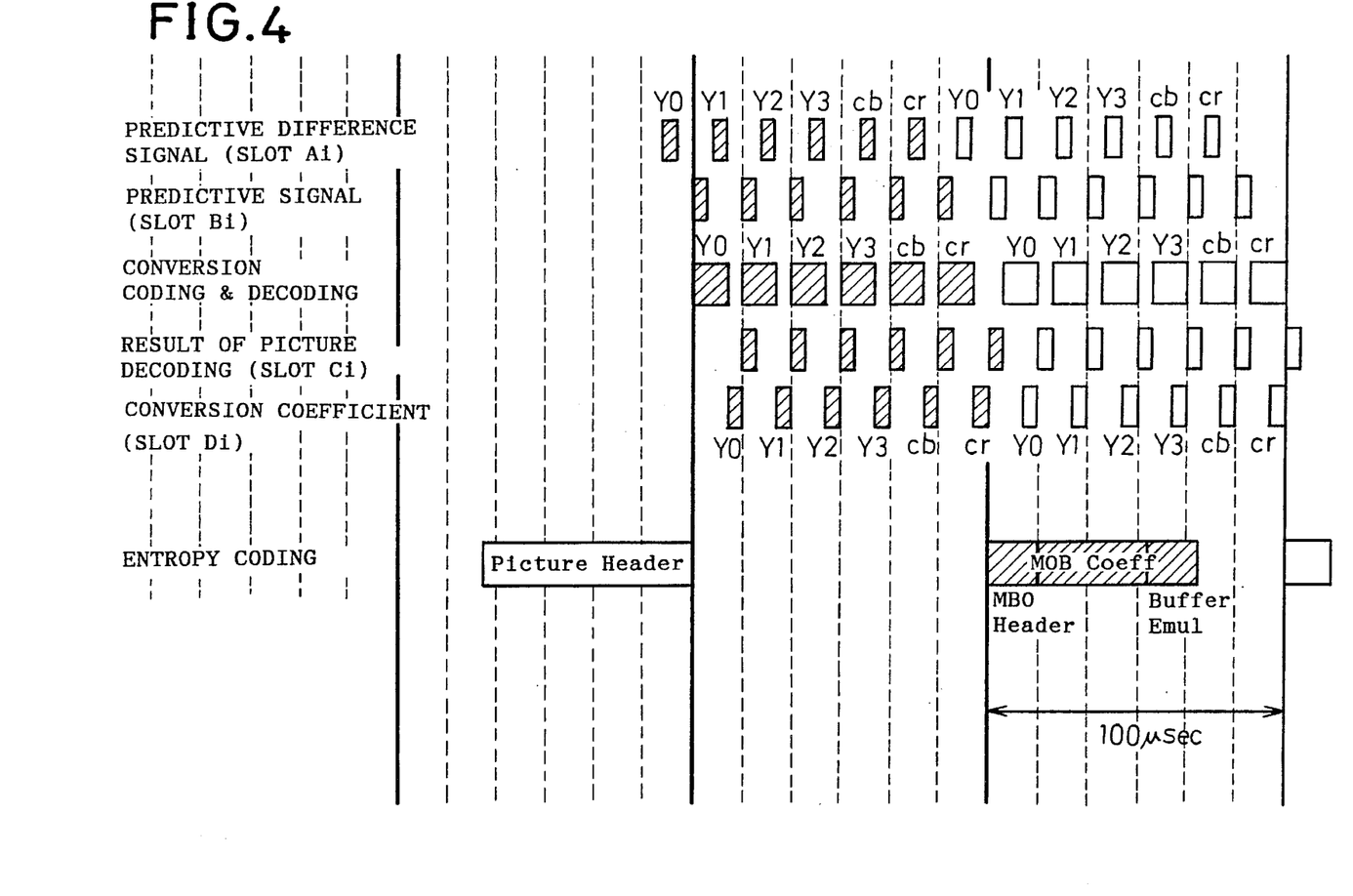
FIG. 4 is a timing chart illustrating data transfer of a macroblock layer of the MPEG and execution of processing.
Figure 5:
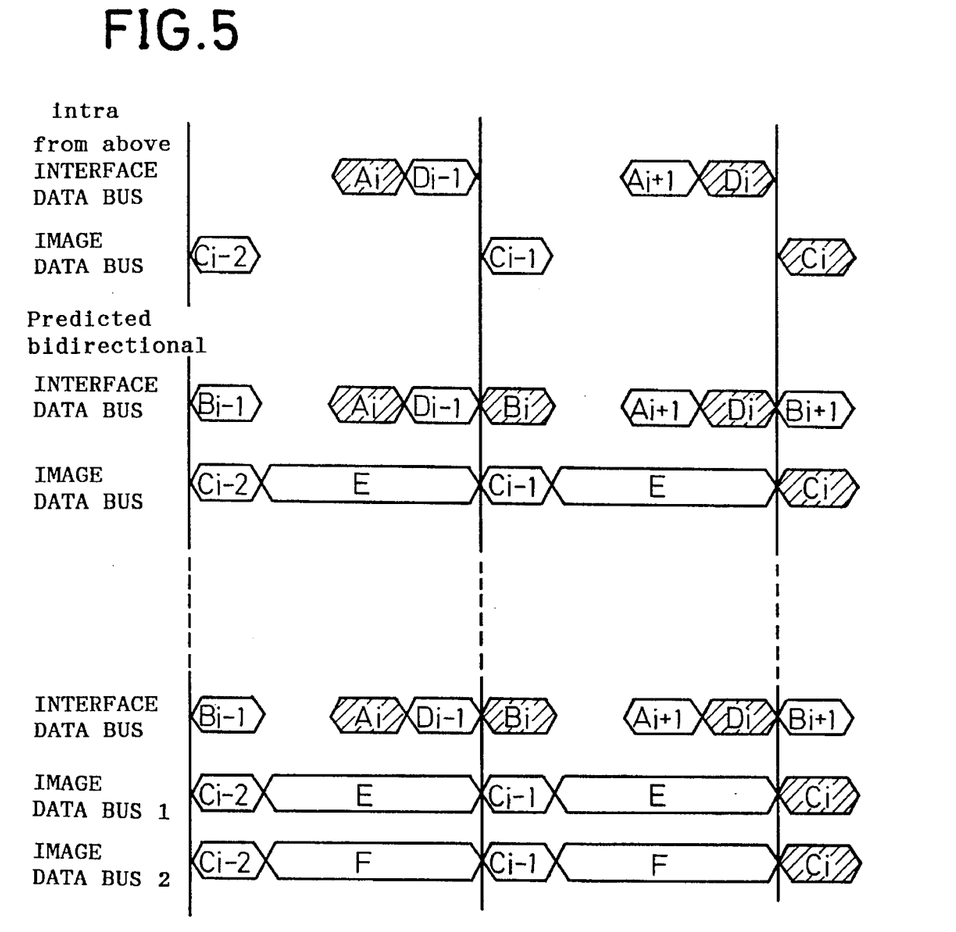
FIG. 5 is a timing chart illustrating a relationship between data transfer of a block layer of the MPEG and buses.
Figure 6:
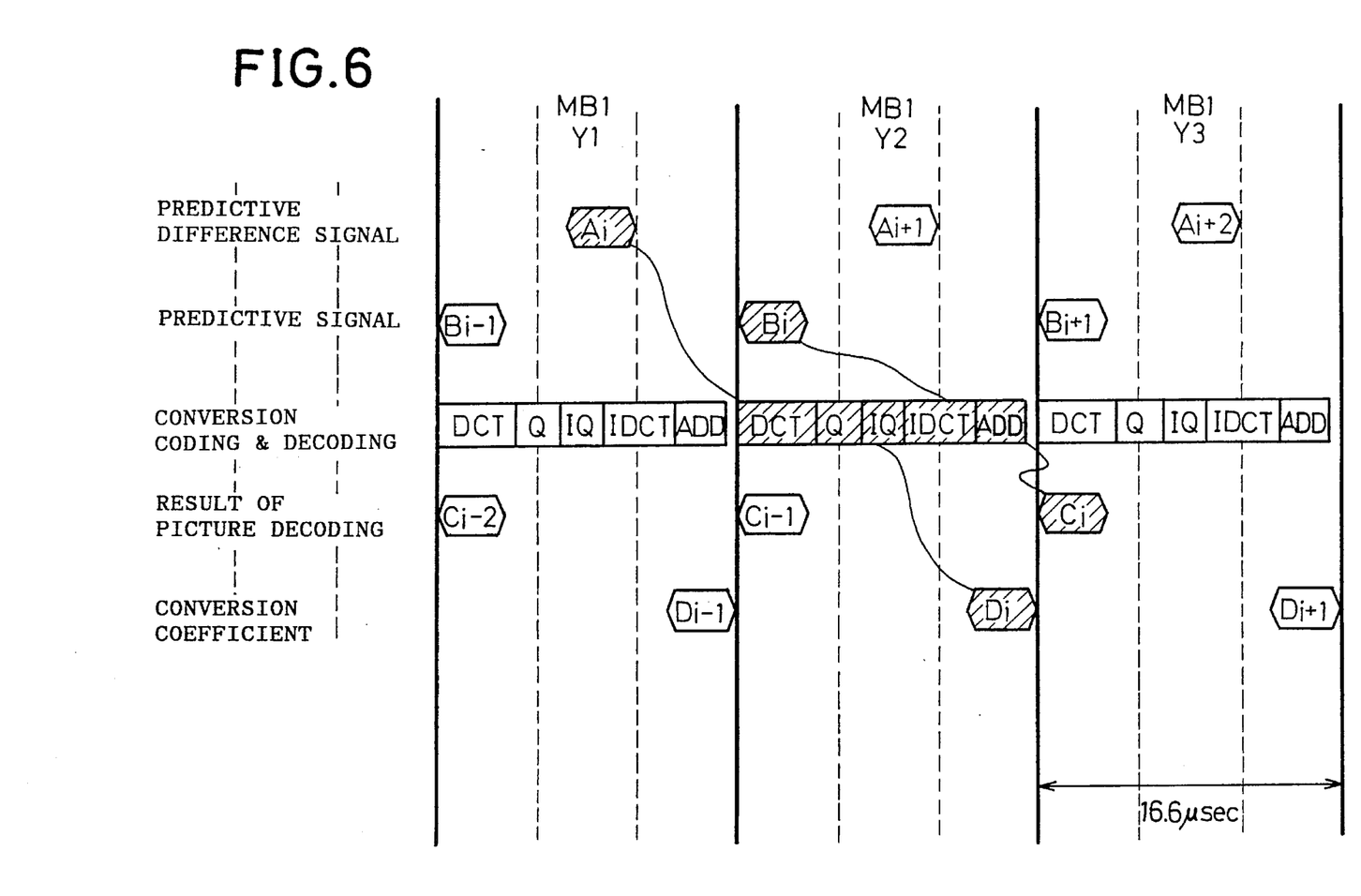
FIG. 6 is a timing chart illustrating data transfer in a block layer of the MPEG and execution of processing.

FIG. 4 shows timings of transfer and execution of processing for a macroblock layer of the MPEG; FIG. 5 illustrates a relationship between transfer of data of a block layer of the MPEG and buses; and FIG. 6 shows timings of transfer of data and execution of processing for a block layer of the MPEG. It is to be noted that, signification on an algorithm of data flowing in each transfer slot in FIG. 5 can be recognized from comparison with the description given hereinabove with reference to FIG. 3. In particular, data are transferred in the following manner:

slot Ai: predictive difference signal of block slot Bi: predictive signal of block slot Ci: signal of result of picture decoding of block i slot Di: conversion coefficient signal of block i slot E: picture signal for motion compensation A basic form of time-division multiplex transfer burst transfer for each 64 (8×8) words, and each transfer slot shown in FIG. 5 corresponds to transfer of 64 words except the slot E. It is to be noted that, when the core frame memory 104 is to be accessed, the address generation section 123 generates a two-dimensional address for such burst transfer. Meanwhile, coding processing at the zigzag scan/entropy coding section 101 is performed in units of a macroblock while coding processing at the conversion coding and decoding section 102 is performed in units of a block. Here, while processing timings regarding the motion compensation section 103 are omitted, the processing is executed as pipeline processing in units of a macroblock, and an inter-frame predictive signal is outputted after delay of about three blocks of the picture input.

Subsequently, while the picture 150 to be decoded is inputted to the motion detection/prediction section 121 of the motion compensation section 103 as described hereinabove, such frame conversion as described hereinabove with reference to FIG. 1 is performed first. An execution timing of the motion detection and prediction section 121 which inputs and processes the picture input 150 is generated by the video timing control section 122, and generation of an address for read-out of the core frame memory 104, which is necessary for motion detection and prediction, is executed by the core frame two-dimensional address generation section 123. The output control signal from the address generation section 123 includes, in addition to an address of the memory 104, a read signal and a write strobe signal. It is to be noted that a time slot used for transfer corresponds to the portion E shown in FIG. 5.

As a result of such processing of the motion detection and prediction section 121 as described above, a predictive difference signal (time slot Ai) and a predictive signal (time slog Bi) are outputted. Meanwhile, since DCT processing and quantization processing are executed for the predictive difference signal in the Inside of the conversion coding and decoding section 102, a result of such processing is outputted as a conversion coefficient signal (time slot Di) to the interface data bus 142. Further, in the conversion coding and decoding section 102, dequantization processing and inverse DCT processing of the conversion coefficient are performed, and then a predictive signal is added to the conversion coefficient and a result of the picture decoding is outputted to the image data bus 143 (time slot Ci).

The internal execution timings of the conversion coding and decoding section 102 are processed so that they may satisfy transfer timings corresponding to a relying relationship of data as seen from FIG. 6. In order to cope flexibly with a plurality of processes such as DCT processing, quantization processing and predictive difference signal addition processing, the inside of the conversion coding and decoding section 102 of such construction may have such a programmable architecture as, for example, a digital signal processor (DSP).

The procedure of operations for processing a block i is illustrated in FIG. 6. It is to be noted that, in FIG. 6, processing of a block i and transfer of data relating to such processing are all indicated by slanting lines. First, at a slot Ai, a predictive difference signal is inputted from the motion compensation section 103, and then the conversion coding and decoding section 102 is activated. At a substantially same timing as the activation, at another slot Bi, a predictive signal is inputted from the motion compensation section 103. A conversion coefficient obtained from the predictive difference signal by DCT processing and quantization processing (Q) is transferred, at a further slot Dt, to the zigzag scan/entropy coding section 101. On the other hand, in the case of a core frame (I- or P-frame), the core frame is transferred to the core frame memory 104 using a different slot Ci.

Subsequently, the conversion coefficient outputted as a result of the processing by the conversion coding and decoding section 102 is stored once into the FIFO memory 115 and then undergoes coding processing in the entropy coding CPU 112. Such writing of data into the FIFO memory 115 is determined so that read-out of the data may be controlled in order of zigzag scan. The coded bit stream is stored once into and then outputted from the FIFO memory 111.

Here, internal execution timings of the entropy coding CPU 112 satisfy such timings as to allow processing of one macroblock to be completed within one macroblock cycle time as shown In FIG. 4 described hereinabove. The kinds of processing may include, for example, coding of a header of a macroblock, coding of a conversion coefficient and control of a code amount count and a quantization scale value. In order to cope flexibly with specifications of such processing, the inside of the entropy coding CPU 112 may have such a programmable architecture as of a macroprocessor. The timing control described above is executed by the two video timing control sections 114 and 122, which are activated in response to the picture synchronizing input signal 151 from the outside. Further, in the inside of the motion compensation section 103, the motion detection and prediction section 121 and the two-dimensional address generation section 123 are activated by a control signal from the video timing control section 122. Further, as regards activation of the conversion coding and decoding section 102 and transfer of burst data among the processing means 101, 102 and 103, they are activated by control signals 141 and 152 from the video timing control section 114. In this instance, the control signal 152 indicates a timing signal providing a timing of activation while the control signal 141 indicates a command signal representative of a kind of operation to be activated.

Figure 7:
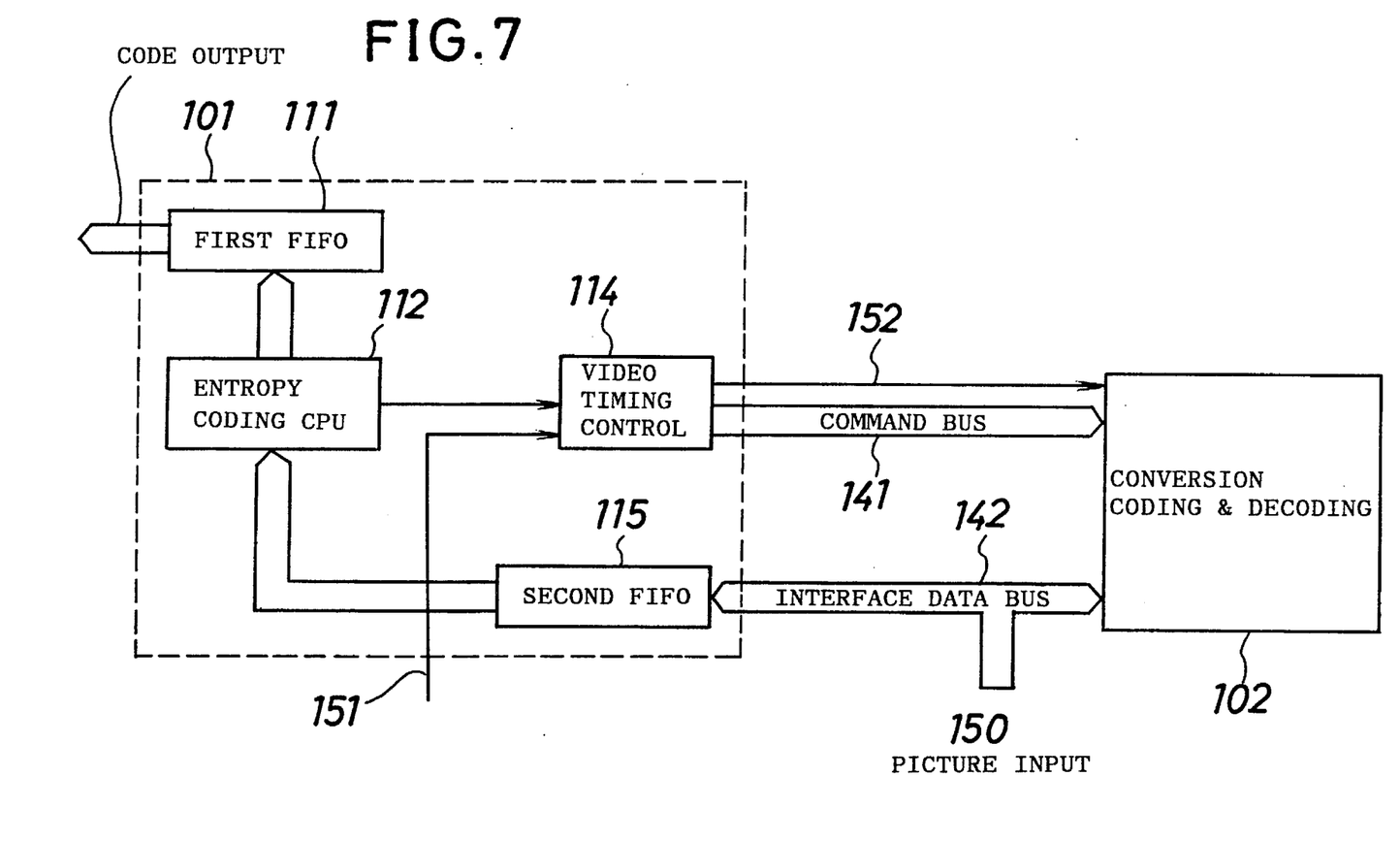
FIG. 7 is a block diagram of another moving picture coding and decoding circuit showing a second preferred embodiment of the present invention.

Referring now to FIG. 7, there is shown another moving picture coding and decoding circuit according to a second preferred embodiment of the present invention. The moving picture coding and decoding circuit of the present embodiment is a modification to and is different from the moving picture coding and decoding circuit of the first embodiment described above only in that it does not include the motion compensation section 103 and the frame memory 104. The moving picture coding and decoding circuit of the present embodiment is applied to a coding system which does not involve inter-frame coding, for example, a coding system based on the JPEG (Joint Photographic Coding Experts Group) standard of the ISO. When considering a moving picture coding and decoding circuit within the limits of such coding system of the MPEG of the ISO, attention should be paid only to coding with I-frames while omitting both of P- and B-frames.

Further, as regards the algorithm, attention should be paid so that it may eliminate all algorithms except those for DCT processing, quantization processing, zigzag scan processing and entropy coding processing described hereinabove with reference to FIG. 3. It is to be noted that the basic idea of hierarchic time-division multiplex transfer described hereinabove in connection with the first embodiment is maintained also in the present embodiment. However, as regards slots for burst data transfer, only two of slot Ai: picture signal of block i (assumed that all predictive signals are equal to 0 for a predictive difference signal)

slot Di: conversion coefficient signal of block i are used. Further, since no core frame is required for the algorithm, the core frame memory 104 and a control element or elements for the core frame memory 104 are not required either. Further, the reason why the first video timing control section 114 and the second video timing control section 122 are formed as separate sections is that, also in the present embodiment, activation of the conversion coding and decoding section 102 and starting of burst data transfer among the processing means 101, 102 and 103 may be caused by control signals 141 and 152 from the video timing control signal 114.

In the present embodiment, a picture divided into blocks is inputted from the interface data bus 142 to the conversion coding and decoding section 102 (time slot Ai). In the inside of the conversion coding and decoding section 102, DCT processing and quantization processing of a predictive difference signal are executed, and a result of the processing is outputted as a conversion coefficient signal (time slot Di) to the interface data bus 142. Further, internal execution timings of the conversion coding and decoding section 102 are determined so that they may satisfy transfer timings corresponding to a relying relationship of data as seen from FIG. 6 described hereinabove. In order to realize this, the inside of the conversion coding and decoding section 102 may have such a programmable architecture as, for example, of a digital signal processor (DSP). A conversion coefficient outputted as a result of the processing of the conversion coding and decoding section 102 is stored once into the second FIFO memory 115 of the zigzag scan/entropy coding section 101 and then undergoes coding processing in the entropy coding CPU 112. Such writing of the data into the second FIFO memory 115 is determined so that read-out of data may be controlled readily in order of zigzag scan. Then, a bit stream obtained by coding by the entropy coding CPU 112 is stored once into and then outputted from the first FIFO memory 111.

Internal execution timings of the entropy coding CPU 112 are determined so that they may satisfy such timings as to allow processing of one macroblock to be completed within one macroblock cycle time as described hereinabove with reference to FIG. 4. The kinds of such processing may include, for example, coding of a header, coding of a conversion coefficient, and control of a code amount value and a quantization scale value. Further, the Inside of the entropy coding CPU 112 may have such a programmable architecture as, for example, of a microprocessor.

Figure 8:
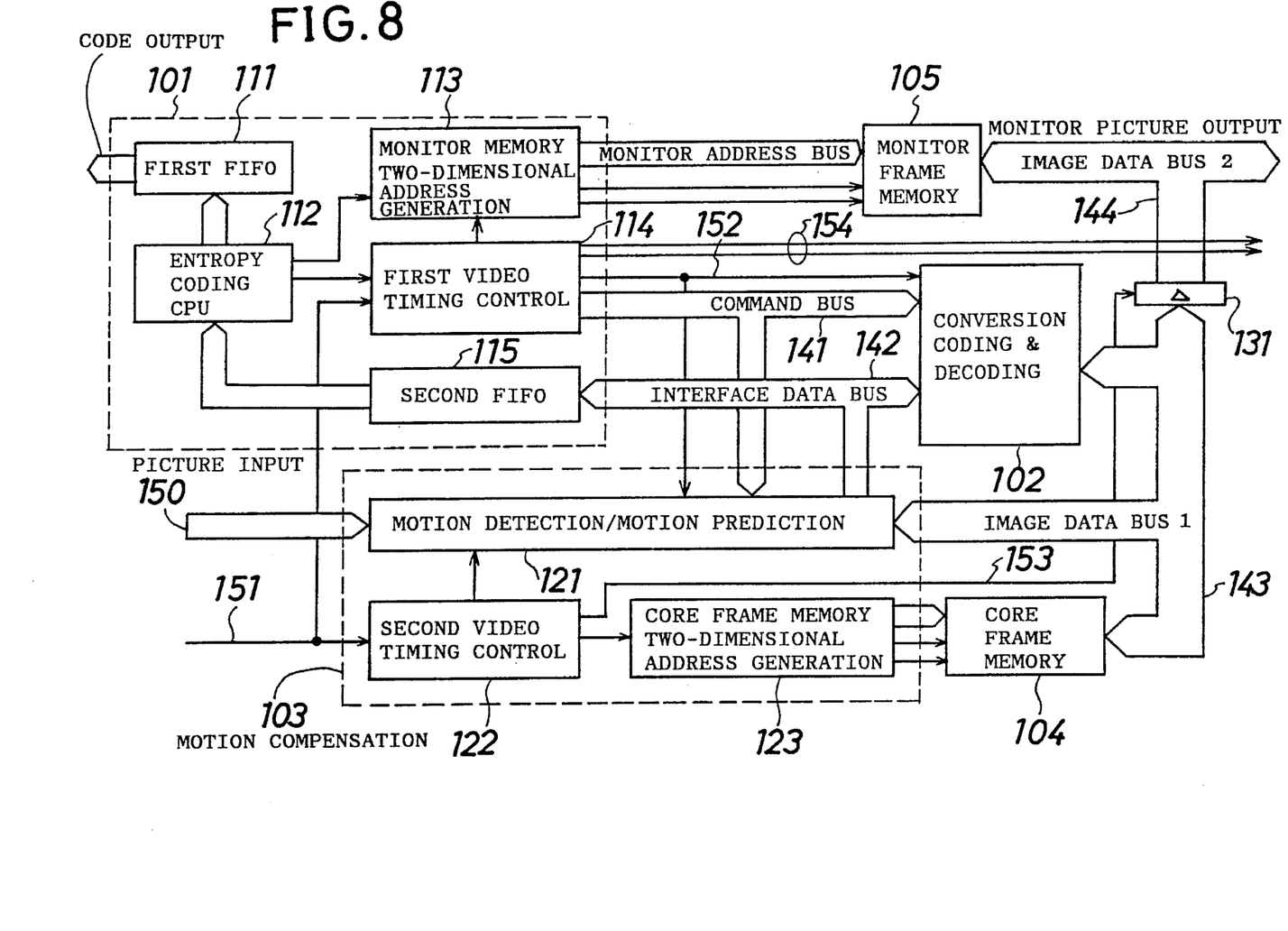
FIG. 8 is a block diagram of a further moving picture coding and decoding circuit showing a third preferred embodiment of the present invention.

Referring now to FIG. 8, there is shown a moving picture coding and decoding circuit according to a third preferred embodiment of the present invention. The moving picture coding and decoding circuit of the present embodiment is another modification to and is different from the moving picture coding and decoding circuit of the first embodiment shown in FIG. 2 in that it additionally includes a monitor frame memory 105, and a two-dimensional address generation section 113 and a bus buffer 131 for the monitor frame memory 105. The bus buffer 131 is used in order to divide an image data bus. The principal difference of the present embodiment from the first embodiment resides In that it additionally has a function of reproducing a decoded image as it is in order to supervise the influence upon the picture quality of a quantization error upon coding of a picture simultaneously with coding processing. Such reproduction of a decoded picture can be executed by displaying contents of the core frame memory 104 as they are. However, only I-frames and P-frames are inputted alternately to the frame memory 104, but no B-frame is stored into the frame memory 104. Further, since a core frame itself is an object for motion compensation processing, a great number of read accesses are required, and accordingly, there is the possibility that access competition of a read access with an access for reading of the memory executed for the object of monitoring. In the following description, a solution to the problem which involves provision of an additional frame memory will be described.

First, as regards the algorithm, it is such as described hereinabove with reference to FIG. 3, and the basic idea of hierarchic time-division multiplex transfer described hereinabove in connection with the first embodiment is maintained also in the present embodiment. Further, as regards a slot for transfer of burst data, writing control into the monitor frame memory 105 and so forth are added.

Subsequently, in the inside of the conversion coding and decoding section 102, DCT processing and quantization processing of a predictive difference signal are executed, and a result of the processing is outputted as a conversion coefficient signal (time slot Di) to the interface data bus 142. Further, the conversion coding and decoding section 102 executes dequantization processing and inverse DCT processing of the conversion coefficient, adds a predictive signal to the conversion coefficient and outputs a result of the picture decoding to the image data bus 143 (time slot Ci). In a transfer period of the time slot Ci, writing into the monitor frame memory 105 is executed simultaneously with writing into the core frame memory 104. While the core frame memory 104 receives a large number of read accesses for the object of motion compensation processing, acceptance of such an access is executed in the time slot E as described hereinabove.

On the other hand, while the monitor frame 105 receives read accesses for the object of supervising processing, acceptance of such an access is executed in the time slot F of FIG. 5 described hereinabove. The bus buffer 131 is provided in order to eliminate otherwise possible competence of the time slots E and F. The bus buffer 131 passes data from the image data bus 143 to the Image data bus 144 therethrough only when transfer in a time slot C1 takes place. While this control is executed by the video timing control section 122, it may otherwise be executed by the video timing control section 114.

Subsequently, generation of an address for readout of the monitor frame memory 105, which is necessary for supervising processing, is executed by the monitor memory two-dimensional address generation section 113. The output control signal from the address generation section 113 may include, in addition to an address of the monitor frame memory 105, a read signal and a write strobe signal. Further, a control signal 154, which is outputted from the first video timing control section 114 of the zigzag scan/entropy coding section 101 indicates a timing and a state of an output signal in the time slot F, and the control signal 154 makes an interface signal to a control circuit of a monitor picture output not shown.

Having now fully described the invention, it will be apparent to one of ordinary skill in the art that many changes and modifications can be made thereto without departing from the spirit and scope of the invention as set forth herein.

What is claimed is:

1. A moving picture coding and decoding circuit capable of coding each of picture frames of a moving picture based on one of three predictive coding methods for an intra-frame coded picture, a predictive coded picture and a bidirectional predictive coded picture, comprising:

first processing means for executing motion detection and motion prediction of a moving picture and outputting a picture predictive difference signal and a picture predictive signal;

core frame memory means for storing therein picture frame data necessary for execution of one of said predictive coding methods;

second processing means including an orthogonal transformation section, a quantization section, a dequantization section and an inverse orthogonal transformation section for executing conversion coding with said picture predictive difference signal to output a conversion coefficient and adding said picture predictive signal to said picture predictive difference signal to output a picture decoding result;

said second processing means further including a video timing control section for selecting processes by said orthogonal transformation section, said quantization section and said inverse orthogonal transformation section and a data transfer process between said first, second and third processing means and for controlling start times of said processes;

monitor frame memory means for storing therein picture frame data with which said picture decoding result is to be monitored;

third processing means for executing entropy coding based on said conversion coefficient and outputting bit variable length code data as a result of said entropy coding;

a first data bus for coupling said core frame memory means and said first and second processing means to each other;

a second data bus coupled to said monitor frame memory means; and bus buffer means for coupling said first and second data buses;

said first processing means including a two-dimensional address generation section for generating an address for said core frame memory means;

said third processing means including a two-dimensional address generation section for generating an address for said monitor frame memory means.

2. A moving picture coding and decoding circuit as claimed in claim 1, wherein said second processing means has a processing function of executing a software program for said conversion coding, and said third processing means has another processing function of executing another software program for construction of sentence structure of said bit variable length code data.

3. A moving picture coding and decoding apparatus for converting an input picture based on a picture frame synchronizing signal received externally, comprising:

a motion detection/motion prediction circuit configured to receive said input picture on an input port of said motion detection/motion prediction circuit at a first time and to execute motion detection processing and motion prediction processing of said input picture in accordance with a timing control signal received on a control port of said motion detection/motion prediction circuit, said motion detection/motion prediction circuit configured to output a processed signal as a result thereof;

a first video timing control circuit;

a second video timing control circuit connected to said motion detection/motion prediction circuit and configured to receive said picture frame synchronizing signal at a second time and to control said motion detection/motion prediction circuit based on said picture frame synchronizing signal, said second video timing control circuit configured to output said timing control signal to said control port of said motion detection/motion prediction circuit as a result thereof;

a core frame memory two-dimensional address generation circuit connected to said second video timing control circuit and configured to output a two-dimensional core frame memory address based on said timing control signal;

a conversion coding and decoding circuit connected to receive said processed signal from said motion detection/motion prediction circuit and configured to receive a different timing control signal and a command type signal, said conversion coding and decoding circuit configured to execute coding and decoding processing of said processed signal based on said command type signal and said different timing control signal and to output a converted signal as a result thereof;

a core frame memory connected to said conversion coding and decoding circuit and to said core frame memory two-dimensional address generation circuit, said core frame memory configured to store said processed signal received from said motion detection/motion prediction circuit at a location in said core frame memory corresponding to said two-dimensional core frame memory address;

a first FIFO memory;

a second FIFO memory connected to receive said converted signal from said conversion coding and decoding circuit and configured to temporarily store said converted signal and to output a stored converted signal as a result thereof;

said first video timing control circuit connected to said conversion coding and decoding circuit and configured to receive said picture frame synchronizing signal at said second time and to control said conversion coding and decoding circuit based on said picture frame synchronizing signal, said first video timing control circuit configured to output said different timing control signal and said command type signal as a result thereof;

an entropy coding processing circuit connected to said second FIFO memory and to said first video timing control circuit, said entropy coding processing circuit configured to apply entropy coding to said stored converted signal received from said second FIFO memory and to output an entropy coded signal as a result thereof, said entropy coding processing circuit also configured to output a monitor timing signal based on an amount of processing performed within said entropy coding processing circuit;

said first FIFO memory connected to said entropy coding processing circuit and configured to temporarily store said entropy coded signal and to output an output code based on said entropy coded signal;

a monitor memory two-dimensional address generation circuit connected to said entropy coding processing circuit and configured to output a two-dimensional monitor frame memory address based on said monitor timing signal received from said entropy coding processing circuit; and a monitor frame memory connected to said monitor memory two-dimensional address generation circuit and said conversion coding and decoding circuit and configured to store said processed signal as a decoded image at a location in said monitor frame memory corresponding to said two-dimensional monitor frame memory address.

4. The circuit as recited in claim 3, wherein said entropy coding processing circuit codes said stored converted signal received from said second FIFO memory into one of an intra-frame signal, a picture frame signal, and a bi-directional frame signal, and wherein said intra-frame signal and said picture frame signal are inputted alternately into said monitor frame memory, and said bi-directional frame signal is not inputted into said monitor frame memory.

* * * * *